(12) United States Patent
Xu et al.

(10) Patent No.: US 9,188,486 B1
(45) Date of Patent: Nov. 17, 2015

(54) SYSTEM AND METHOD FOR COMPENSATING FOR SECOND ORDER DIFFRACTION IN SPECTROMETER MEASUREMENTS

(71) Applicant: DATACOLOR HOLDING AG, Lucerne (CH)

(72) Inventors: Zhiling Xu, Princeton Junction, NJ (US); Michael H. Brill, Kingston, NJ (US)

(73) Assignee: DATACOLOR HOLDING AG, Lucerne (CH)

( * ) Notice: Subject to any disclaimer, the term of this patent is extended or adjusted under 35 U.S.C. 154(b) by 0 days.

(21) Appl. No.: 14/456,687

(22) Filed: Aug. 11, 2014

(51) Int. Cl.
*G01J 3/00* (2006.01)
*G01J 3/42* (2006.01)

(52) U.S. Cl.
CPC .............. *G01J 3/42* (2013.01); *G01J 2003/425* (2013.01)

(58) Field of Classification Search
CPC . G01N 21/314; G01N 21/33; G01N 21/3504; G01J 3/10; G01J 3/42
USPC ........................................................ 356/51
See application file for complete search history.

(56) References Cited

U.S. PATENT DOCUMENTS

| | | | |
|---|---|---|---|
| 5,444,528 A * | 8/1995 | Puschell | 356/73 |
| 2006/0164657 A1 * | 7/2006 | Chalmers et al. | 356/630 |
| 2009/0059228 A1 * | 3/2009 | Horie et al. | 356/369 |
| 2012/0257200 A1 * | 10/2012 | Blasenheim et al. | 356/369 |
| 2013/0258333 A1 | 10/2013 | Chalmers et al. | |

OTHER PUBLICATIONS

Battle, et. al, Advances in Color Management, 9th Congress of the Inter. Color Assoc., Proceedings of SPIE vol. 4421, 785 (2002).

* cited by examiner

*Primary Examiner* — Tarifur Chowdhury
*Assistant Examiner* — Md Rahman
(74) *Attorney, Agent, or Firm* — Leason Ellis LLP

(57) ABSTRACT

The present invention concerns a system and method for identifying and implementing a correction to spectrometer measurements in order to compensate for errors in the measurement values due to second order diffracted light. The present invention in one configuration, measures light reflectance percentages across the same wavelength range for at least one calibration target. From these measurements the portion of the reflectance values resulting from second order diffracted light is identified and corrected for, thereby generating a compensated measurement of the reflectance values of a sample. These compensated values are then provided to a user.

18 Claims, 9 Drawing Sheets

SYSTEM AND METHOD FOR COMPENSATING FOR SECOND ORDER DIFFRACTION IN SPECTROMETER MEASUREMENTS

FIELD OF THE INVENTION

The present invention describes a system and method for correcting errors introduced into the spectrometer measurements due to second order diffraction. The system and method described uses a spectrometer to obtain a measurement of reflectance values for a different calibration targets across a range of wavelengths and utilizing a connection with a processor or computer calculates weighting and compensation coefficients to separate out the portion of the measurement values representing second order diffraction effects. These values are obtained by measuring the reflectance values for UV and non-UV reflecting calibration targets across the same wavelength ranges. The weighting and compensation coefficients are then used along with the measurements obtained from a sample under analysis to determine which portion of the measured reflectance values for a particular sample point are due to actual first-order diffracted light and which portion is due to second-order diffraction effects.

BACKGROUND OF THE INVENTION

Most spectrometers use diffraction gratings to spread out the light so that it can be analyzed into its constituent wavelengths. This light is then focused onto a detector comprised of a linear array of individual detector pixels. The light that strikes a particular pixel is determined by the angle by which the light departs the diffraction grating. This angle is related to the light's wavelength by the well-known diffraction grating equation $d*\sin \theta m = m*\lambda$, where d is the grating spacing, $\theta m$ is the diffraction angle, m is an integer, and A is the wavelength. With d being a fixed property of the diffraction grating, it can be seen that a given angle (and thus a given pixel) corresponds to multiple wavelengths, each paired with a different integer values m.

Conventional diffraction gratings are designed so that most of the light striking the grating and proceeding to the detector winds up in the "first-order beam", which corresponds to m=1. In the ideal case of no light in the higher order beams (m>1) the light arriving at the detector from the diffraction grating has a unique correspondence between the wavelength $\lambda$ and the angle $\theta$ (and thus the detector pixels). However, some amount of light forms a second-order beam so that the light striking a particular pixel can be a combination of light from the first- and second-order beams. For example, the pixel that receives $\lambda$=760 nm first-order (m=1) light might also receive $\lambda$=380 nm second-order (m=2) light. Light of different wavelengths is indistinguishable to the detector pixels, so the resultant intensity of light detected by the pixel (and thus reported to the user by the spectrometer) is an unknown mixture of the two wavelengths. Because the purpose of any optical spectrometer is to measure the intensity of light as a function of wavelength, this mixing of light of different wavelengths is a source of error.

Additionally, spectrometers are operated over all or most of the wavelength range of 380-1050 nm, which is the overlap of the effective wavelength range of silicon-based array detectors (200-1050 nm) and tungsten-halogen light sources (380-2000 nm). Embodiments described herein correct errors due to the presence of second-order light using a method of correcting for second-order diffraction effects in spectrometers by processing the spectrometer output that contains the second-order diffraction response, i.e., without having to remove the second-order diffraction with costly optical filters.

To avoid the problem of second-order diffraction, some spectrometers simply measure over less than a factor of two in wavelength range (e.g., 400-800 nm) and restrict shorter wavelengths from entering the spectrometer (or at least reaching the detector). Since many spectrometer uses require a greater wavelength range than allowed by this method, most miniature spectrometers block second-order light from reaching the detector array by aligning a linearly-graded optical high-pass filter in front of the array. The high-pass cutoff of the filter must be graded along the direction of the detector array because different pixels detect different wavelengths and thus require different second-order light to be either passed or filtered out.

Linearly-graded high-pass filters work well to remove second-order light in practice and are manufactured into tens of thousands of spectrometers a year. However, the linear grading makes the filters expensive to produce (approximately $100 each) and they require careful alignment to the detector during the spectrometer's manufacture. Alternatively, US US2013/0258333 to Chalmers et. al, describes a method for inserting small filters over the sensor element to deduce the effects of second order diffraction. However, what is needed is a low-cost effective solution not requiring physical modification of the spectrometer.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

SUMMARY OF THE INVENTION

As used herein, the reflected-light components are named according to three characters. The first indicates the instrument setting N (ultraviolet included) versus X (ultraviolet excluded). The second denotes a wavelength band, S (short wavelength) versus L (long wavelength). The third denotes a sample and has options Orange (O, which does not reflect much UV) white (W, which reflects substantial UV) used in second-diffraction-order correction, and "any" (A) that the spectrophotometer may measure after the spectrophotometer is second-order-diffraction corrected. In addition, a prefix "r" indicates that the reflected-light component has been divided by a reflected-light component from a perfect reflecting diffuser, to form what is known as a reflectance. For example, rNLO is a reflectance obtained from a UV-included measurement at the long-wave end of the spectrum for the orange calibration target. Finally, the postfix character "c" indicates that the quantity is estimated (or computed) rather than measured.

Also, as used herein, the term "calibration" means the conventional process of measuring a white tile and black trap and taking a ratio of the measurements and assigning it to 100 percent. Such calibration is done for both UV-included and UV-excluded states of the spectrophotometer. On the other hand, the term "correction" means the teaching of the current document, which corrects all measurements for second-order diffraction.

The system and method of the present invention is directed to correcting a spectrometer to compensate the effects of second-order diffraction errors in spectrometer readings, the system comprises a spectrometer and processor configured to execute the process of calibrating the spectrometer for measurement of the reflected wavelengths wherein the reflected wavelengths include ultra-violet wavelengths. The steps of the method also include obtaining with a spectrometer, a first plurality of n reflectance measurements (rNSW(1:n)) taken at a plurality of wavelengths within wavelength range R, the measurements taken at interval z and the spectrometer configured to receive light incident off of a white calibration tile. Additionally, a second plurality n of reflectance measurements (rNLW(1:n)) taken at a plurality of wavelengths within wavelength range R*2 and at a given interval of z*2 and the spectrometer configured to receive light incident off of a white calibration tile are also obtained.

A third and fourth plurality of n reflectance measurements (rNSO(1:n)) and (rNLO(1:n)) representing values output by the spectrometer taken at a plurality of wavelengths within wavelength ranges R and R*2, and in given intervals z and z*2, respectively, are obtained from light incident off of an orange calibration tile.

The method also foresees calibrating the spectrometer for measurement of the reflected wavelengths wherein the reflected wavelengths exclude ultra-violet wavelengths and obtaining a fifth plurality of n reflectance measurements (XLO((1:n)) taken at a plurality of wavelengths within wavelength range R*2 and at a given interval of z*2 from the spectrometer configured to receive light incident off of an orange calibration tile.

Once these values have been acquired a first compensation coefficient (w), and a second compensation coefficient (c) from the first, second, third, fourth and fifth plurality of measurement values are generated. Using these calibration values, a measurement of the reflectance values for a sample taken at a plurality n wavelengths within wavelength range R in given intervals z (rNSA(1:n)), and taken at a plurality of wavelengths within wavelength range R*2 in given intervals z*2 (rNLA(1:n)) using a spectrometer with UV light included is calibrated and corrected according to the equation $$rNLAc(1:n)=(rNLA(1:n)-rNSA(1:n)*w(1:n))*c(1:n).$$

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION OF A PREFERRED EMBODIMENT

By way of overview and introduction, the present invention concerns a system and method for identifying and implementing a correction to spectrometer measurements in order to compensate for errors in the measurement values due to second order diffraction effects. The present invention in one configuration, measures reflectance percentages across the same wavelength range for both the sample under evaluation and calibration targets. From these measurements the portion of the reflectance values resulting from second order diffraction effects is identified and compensated for, thereby generating a compensated measurement of the reflectance values of a sample. These compensated values are then provided to a user.

As used herein, the "reflectance values" are reflectance percentages measured by the spectrometer for a given sample. Furthermore, as used herein, "wavelength range" is the range of wavelengths of light measured by the spectrometer. In the illustrated examples, the range of wavelengths is from between 350 nm and 750 nm. However, those possessing ordinary skill in the art will appreciate that so long as the goals and methods of the present invention are pursued, other wavelengths are used in alternative configurations of the system and method described.

Figure 1:
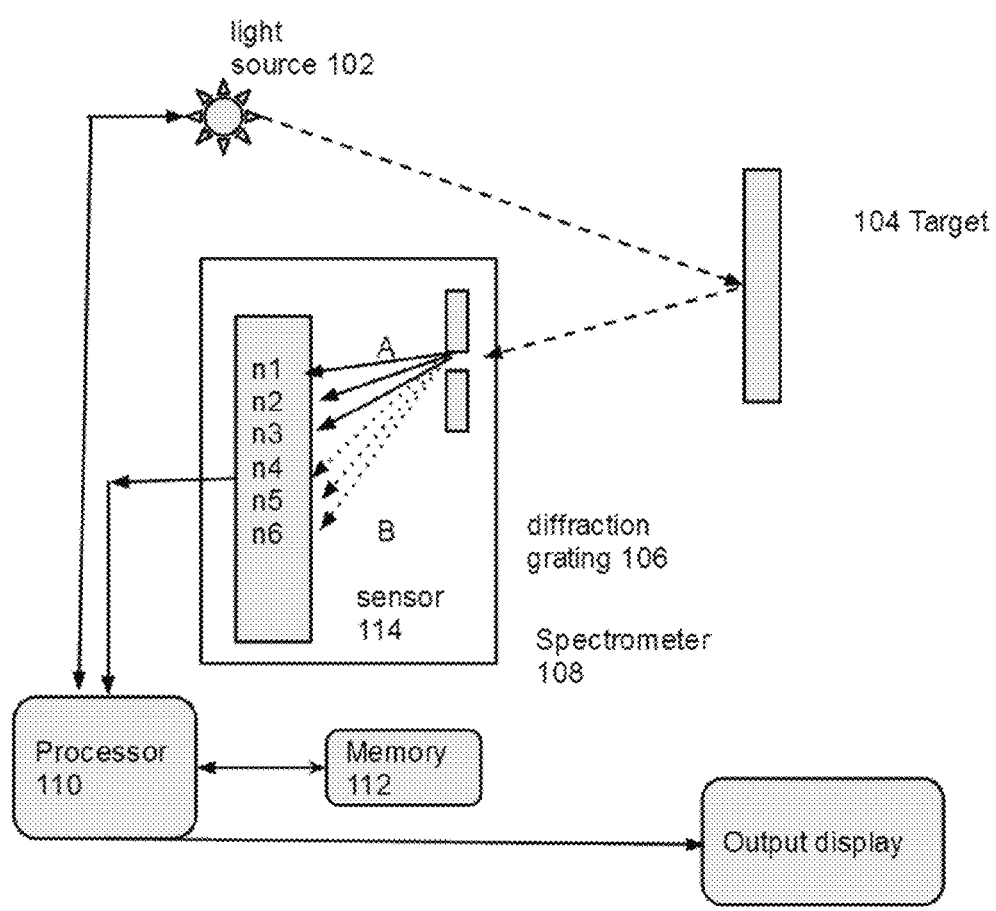
FIG. 1 is a high level block diagram of the system configured to correct measurement distortions due to the presence of second-order light.

As shown in FIG. 1 the present invention includes a light source 102 configured to emit a beam of light towards a target 104. In one arrangement, a lens or other beam conditioning elements (not shown) are placed in the path of the beam. In a further arrangement, the light source 102 is configured to produce light in wavelengths from 340 to 750 nm. However, alternative light sources are configured to provide narrower, wider, or shifted range of wavelengths. In one embodiment, a plurality of light sources is provided. In a further arrangement, a plurality of light sources are provided and have different wavelength and other characteristics. In a further arrangement, the characteristics of the light source(s) are variable depending on control signals or instructions sent by a processor 110.

The light beam emitted by the light source 102 is incident off of the target 104 and reflected to a spectrometer 108. In one arrangement the target 104 is a calibration target, such as a white or orange tile. In another configuration the target is a transmission calibration target. In configurations using a transmission target, the sensors 114 and light source 102 are configured to pass light through the transmission sample and not reflect light off of the transmission sample.

In a further arrangement of the present invention, the target 104 is a sample under analysis. The spectrometer 102 is configured to measure light incident off of the target 104 and evaluate the reflectance values across a range of wavelengths according to pre-set operational software or hardware. Alternatively, the spectrometer 108 is connected to an external processor 110 configured to receive signals and process signals generated by the spectrometer.

In one particular arrangement, the spectrometer 108 is a dual-beam spectral analyzer, as described in Battle, et. al, *Advances in Color Management*, 9th Congress of the Inter. Color Assoc., Proceedings of SPIE Vol. 4421, 785 (2002). In one configuration, the spectrometer includes a 256 pixel CMOS array with a wavelength range of from 360 to 780 nm and a wavelength resolution of 1.8 nm and a signal-to-noise performance of 85 dB. However, other standard, commercially available and/or customized spectrometers can be utilized in the system and methods described herein.

Returning to FIG. 1, the spectrometer 108 illustrated is a grating based optical spectrophotometer configured to diffract light using a diffraction grating 106 in different directions depending on the wavelength of the light. In this arrangement, the spectrometer 108 is equipped with a sensor array 114 made of light sensing elements or sensors n1-n6. For clarity, only six light sensor elements are shown. However, the system describe is configurable with different numbers of light sensing elements. For example and in no way limiting, the sensor is made up of a CMOS 256 pixel diode element array. In the illustrated arrangement, the spectrometer 108 uses a dual linear sensor array. The sensors n1-n6 are arranged within the array such that light striking a particular sensor element is understood to have a specific wavelength. The spectrometer 108 is configured to generate a specific signal corresponding to the reflectance percentage of light striking a particular sensor(s) and determine based on an internal mapping of sensor, what wavelength of light is incident on the sensor element.

The spectrometer 108 is configured with hardware suitable for outputting a signal corresponding to the wavelengths, and the reflectance percentage of each wavelength of light incident on the sensor 114.

In one arrangement, the spectrometer 108 is equipped with a computer, such as processor 110, configured to evaluate, determine and output the resultant measurements of the reflectance percentages across the measured wavelength range. In one arrangement the computer is integral to the spectrometer. In an alternative arrangement, the spectrometer 108 transmits signal a processor 110 for analysis and evaluation to an external processor. In a further arrangement, the processor 110 is a separate or remote processor configured to communicate with the spectrometer (itself equipped with an internal processor for analysis and communication) through a bi-directional communications link, such as a coaxial, fiber-optic, USB, Firewire, Wi-Fi, RFID, wireless or custom interface.

The processor 110 is equipped to connect and communicate with a memory storage device 112. In one specific implementation, the memory 112 is a local storage device. In an alternative arrangement, the memory 112 is a remote storage device or server implemented storage device, such as a FTP or cloud based storage mechanism connected to via an Internet connection.

Thus, according to the present invention, when measurements are made by the spectrometer, a set of data points corresponding to reflectance values at specific wavelengths are recorded. Of these data points, there are a number (n) corresponding to a number of measurements at the lower end of the wavelength range whose second order diffraction effects will impact other (and a correspondingly equal number (n)) data points at the longer wavelength end of the wavelength range.

Thus, the present invention describes determining and implementing a set of adjustment factors or coefficients relating to the second order diffraction effects at the longer wavelengths that are used to correct the effects thereof and generate accurate measurements of the reflectance percentages. This is done by taking a number of measurements of the reflectance values present at certain wavelengths for light reflected off of white and orange tiles and using these values to correct the reflectance values obtained from a sample.

In one arrangement, a series of modules, configured as code executing in the processor 110, are utilized to by the system described to identify which portion of the longer wavelength light is due to shorter wavelength second order effects and which portion is a true measurement. In one embodiment, the modules described configure the processor 110 to execute code in order to compute the second-order diffraction efficiency at different wavelengths according to the algorithm derived herein. The following provides an example of the mathematical development of the algorithm equations.

Those possessing ordinary skill in the art will appreciate that the measured long-wavelength signal from the white tile is changed by an amount that, wavelength by wavelength, is proportional to the corresponding short-wavelength excitation by a target-independent factor w (whose wavelength dependence is captured in the notation w(1:n):

$$NLW(1:n)=NLWt(1:n)+NSW(1:n)*w(1:n) \qquad (1)$$

Furthermore, it should be recalled that NLW with no r prefix is a reflected light and not a reflectance. The goal will be to generate values that depend only on reflectance measurements, which are quotients of reflected-light measurements.

The variables used in the calculations are provided as the following:

"n" is the number of data points at the shorter end of the wavelength range whose second-order diffraction effects will impact the same number of longer wavelength end measurements. Measurements made using the second-order-diffraction correction are categorized according to the following conventions:

("N") indicates that the data value originated from a target sample includes reflected UV light where the spectrometer was in a UV-included configuration.

("X") indicates a measurement made using the spectrometer in a UV-excluded configuration.

("S") indicates a measurement obtained from the shorter end of the wavelength range.

("L") indicates a measurement obtained from the longer end of the wavelength range.

("W") indicates a measurement obtained using a white calibration tile.

("O") indicates a measurement obtained using an orange calibration tile.

("A") indicates a measurement obtained using a sample.

As described herein, the measured values at longer end of the wavelength range (rNLW(n:1)) are composed of both the true light reflectance measurement value (rNLWt(1:n)) (that would have been obtained from some other reference instrument and only includes first-order-diffracted light) as well as the product of the light reflectance measurement values obtained at low wavelength and the target-independent factor w percentage.

In order to determine the true compensated value for the white tile, it is further assumed that the reflectance of the corrected long-wavelength component is proportional to the uncorrected value via a target-independent correcting coefficient c(1:n) defined using equation 2.

$$rNLWc(1:n)=NLWt(1:n)*c(1:n) \qquad (2)$$

where rNLWc(1:n) are the corrected reflectance values, and c(1:n) are the correction coefficients.

Equations 3 and 4, analogous to 1 and 2, are also assumed to apply to the orange reference target (with the same weighting coefficients c and w):

$$NLO(1:n)=NLOt(1:n)+NSO(1:n)*w(1:n) \quad (3)$$

$$rNLOc(1:n)=NLOt(1:n)*c(1:n) \quad (4)$$

At any given n, it is not possible to solve Eqs. 1-4 for coefficients w and c, because of the unknown quantities NLWt, NLOt, rNLWc and rNLOc. Thus, a corrected value for the longer wavelength range data points require both a UV included and UV excluded calibration, calculation, and compensation. The following assignments are made:

$$rNLWc(1:n)=rXLW(1:n) \quad (5)$$

$$rNLOc(1:n)=rXLO(1:n) \quad (6)$$

These assignments estimate the true UV-included white and orange reflectances as being the same as the measured reflectances at these wavelengths with UV excluded.

A final assumption (which is sufficient but may not be necessary) is that $$NLW(1:n)=NSW(1:n), \quad (7)$$

namely that the white signal is the same at both ends of the spectrum.

From the assumptions implicit in Eqs. 1-7, the following expressions can be derived for w(1:n) and c(1:n):

$$w(1:n)=(rXLO(1:n)*rNLW(1:n)-rXLW(1:n)*rNLO(1:n))/(rXLO(1:n)*rNSW(1:n)-rXLW(1:n)*rNSO(1:n)) \quad (8)$$

Additionally, c(1:n) is determined to be $$c(1:n)=rNLW(1:n)/((rNLW(1:n)-rNSW(1:n)*w(1:n))) \quad (9)$$

Thus, with w and c deduced, any reflectance measurement result can be corrected for second order diffraction effects according to the following $$rNLAc(1:n)=(rNLA(1:n)-rNSA(1:n)*w(1:n))*c(1:n) \quad (10)$$

Given Eqs. 8-10, the following process describes the detailed steps of this correction, using the example n=8:

1) Calibrate instrument with UV included configuration on a white tile.
2) Get rNSW(1:8) for wavelengths 340 nm~375 nm with 5 nm interval. Within the index bounds, 360 nm and 370 nm use the directly measured reflectances, 340 nm~355 nm use the same reflectance as 360 nm, 365 nm uses the average of 360 nm and 370 nm reflectances, and 375 nm uses the average of 370 nm and 380 nm reflectances.
3) Get rNLW(1:8) for wavelengths 680 nm~750 nm with 10 nm interval from direct measurement.
4) Measure an orange tile using instrument calibrated in step 1.
5) Get rNSO(1:8) for wavelengths 340 nm~375 nm with 5 nm interval as in step 2.
6) Get rNLO(1:8) for wavelengths 680 nm~750 nm with 10 nm interval from direct measurement.
7) Calibrate instrument with UV excluded configuration on a white tile.
8) Measure an orange tile using instrument calibrated in step 7.
9) Get rXLO(1:8) and rXLW(1:8) for wavelengths 680 nm~750 nm from direct measurement.
10) Calculate w(1:8) according to:

$$w(1:n)=(rXLO(1:n)*rNLW(1:n)-rXLW(1:n)*rNLO(1:n))/(rXLO(1:n)*rNSW(1:n)-rXLW(1:n)*rNSO(1:n)) \quad (8)$$

11) Calculate c(1:8) according to:

$$c(1:n)=rNLW(1:n)/((rNLW(1:n)-rNSW(1:n)*w(1:n))) \quad (9)$$

The above 11 steps now provide the basis for calculating the second-order-diffraction corrected reflectance for any sample A given raw measurements from the long and short wavelengths:

For any given sample when measured with instrument calibrated in step 1 (UV included), calculate rNLAc(1:n) for corrected reflectances in the range of 680 nm~750 nm with 10 nm interval using the above equations rewritten below as:

$$rNLAc(1:n)=(rNLA(1:n)-rNSA(1:n)*w(1:n))*c(1:n) \quad (10)$$

Figure 3:
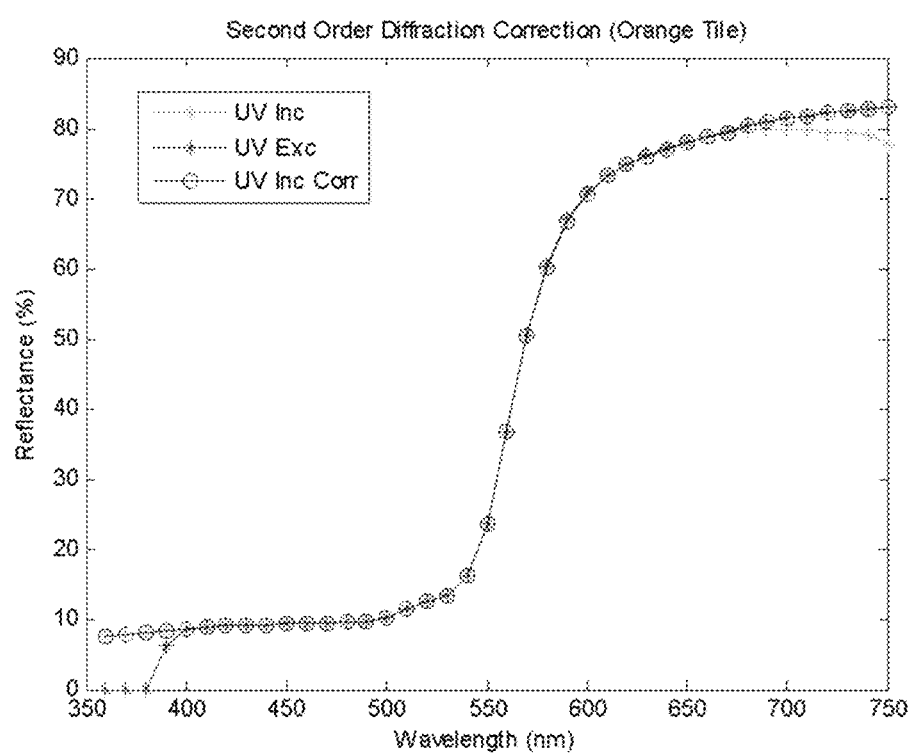
FIG. 3 is a plot showing the corrected measured reflectance values according to the system and method of one aspect of the present invention.

FIG. 3 provides a graph of an orange tile measurement using the corrected measurement values, and plotted along with the uncorrected values for UV included configurations and UV excluded configurations of the spectrometer 108.

Figure 4:
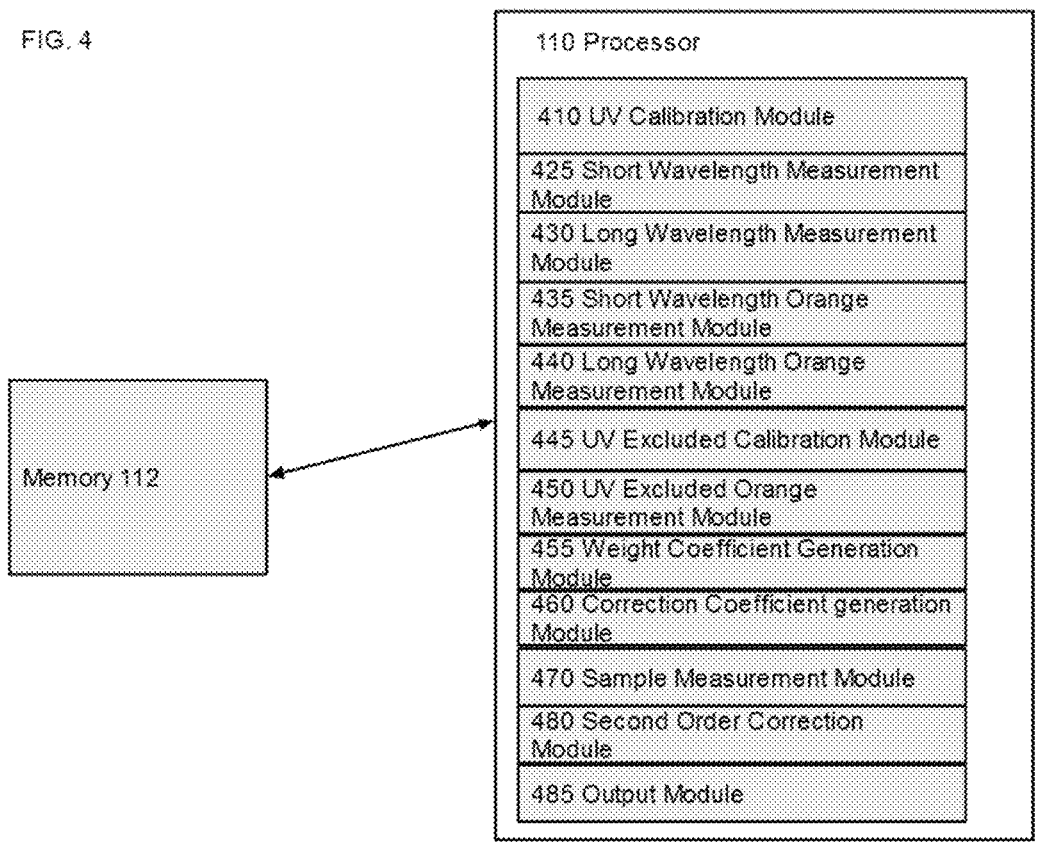
FIG. 4 is a flow diagram detailing the steps of an embodiment of the method described herein.

In one arrangement of the described system, the processor 110 is configured to perform a series of discrete steps to access, generate and evaluate the measurements of the spectrometer 108 according to the equations above and output the results. FIG. 4 details a particular work-flow in connection with one embodiment of a system in accordance with aspects of the invention. The steps detailed in FIG. 4 can be carried out by code executing within the memory of the processor 110, as may be organized into one or more modules, or can comprise firmware or hard-wired circuitry. For simplicity of discussion, the code is described in the form of modules that are executed within the processor 110 and which are each organized to configure the processor 110 to perform specific functions. The block diagram of FIG. 5 provides an exemplary description of the modules that operate with the memory 112 and processor 110 to implement the steps outlined in FIG. 4.

Figure 6:
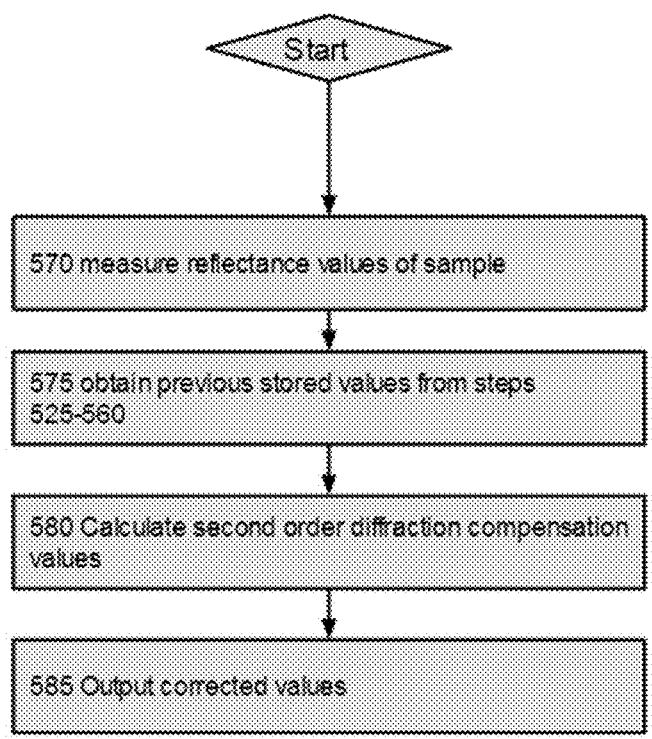
FIG. 6 is a block diagram of an example system in an off-line configuration in accordance with an embodiment of the present invention.

The work-flow of FIG. 4 represents an on-line work-flow where each of the steps recited and their corresponding modules are accessed during a single measurement session. In the alternative, FIG. 6 presents a work-flow according to an alternative arrangement, where the calibration measurements are preformed separately from the sample measurements, either temporally, geographically or both.

Figure 5:
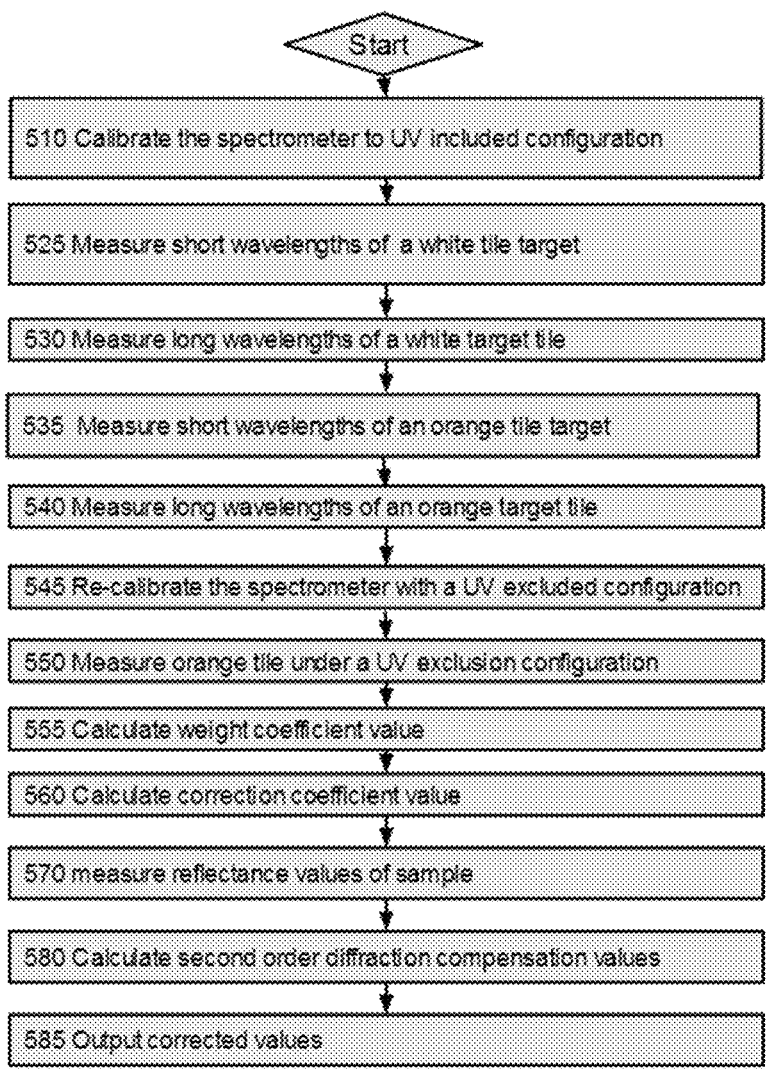
FIG. 5 is a block diagram of an example system in an on-line configuration in accordance with an embodiment of the present invention.

With reference to FIGS. 4 and 5, the second order diffraction effect correction system is implemented by at least one UV included calibration module 410 which comprises code executing in the processor 110 to calibrate the spectrometer in a UV included configuration according to step 310. In a further configuration, the results of the UV included calibration module 410 are stored in a memory 112 or a storage device for retrieval by the processor 110 configured to access the stored data. In a further arrangement, the calibration module 410 is used to configure the processor 110 to adjust the values measured by the spectrometer 108 such that they conform to a known white tile spectrographic profile stored in a memory 112.

Once the spectrometer 108 has been calibrated to the UV included configuration, the processor 110 of the system is configured by a UV included short wavelength measurement module 425, which can comprise code executing in the processor 110, to receive from the spectrometer 108, the data relating to the reflectance values measured from light reflected off of a white calibration tile at each of the wavelengths of the measurement n data points as in step 325. In the recited step, a white calibration tile is reinserted into the spectrometer 108 and values corresponding to the wavelengths found in the n data set are measured and assigned a collective variable rNSW(1:n). The rNSW(1:n) data is stored in a memory or storage device 112.

As an example, and in no way limiting the scope of the features of the system described, in a scenario wherein n=8, the UV included short wavelength measurement module 425 configures the processor measure the reflectance percentage values for wavelengths 340 nm~375 nm with a measurement of interval of 5 nm (i.e. 8 discrete measurements that correspond to n data points obtained from measuring the sample). The UV included short wavelength measurement module 425 measures directly the values for the reflectance at 360 nm and 370 nm. For 340 nm~355 nm, the module 425 configures the processor 110 to assign values that are the same as the 360 nm values. For the 365 nm wavelength, the module 425 configures the processor to obtain the average of 360 nm and 370 nm reflectance, and 375 nm is calculated according to the average of 370 nm and 380 nm reflectance. Thus, the short wavelength calibration module 425 generates a rNSW(1:n) value for use in determining the adjustment factor to eliminate the second order diffraction impact.

The system is also configured to obtain measurements from longer wavelengths that are incident on the sensor elements 114 utilizing a UV included long wavelength measurement module 430, which can comprise code executing in the processor 110, to receive from the spectrometer 108, the data relating to the wavelengths of light measured at twice the wavelengths and twice the measurement intervals of each of the originally measured n data points, as in step 330. These data points are assigned the variable prefix rNLW(1:n) and are stored in a memory or storage device 112. As used with the example provided for the short wavelength calibration measurement, the long wavelength measurement module 430 is configured to measure the reflectance percentage at different wavelengths between 680~750 nm at 10 nm intervals (i.e., twice the original n values and twice the n value measurement interval).

Figure 2:
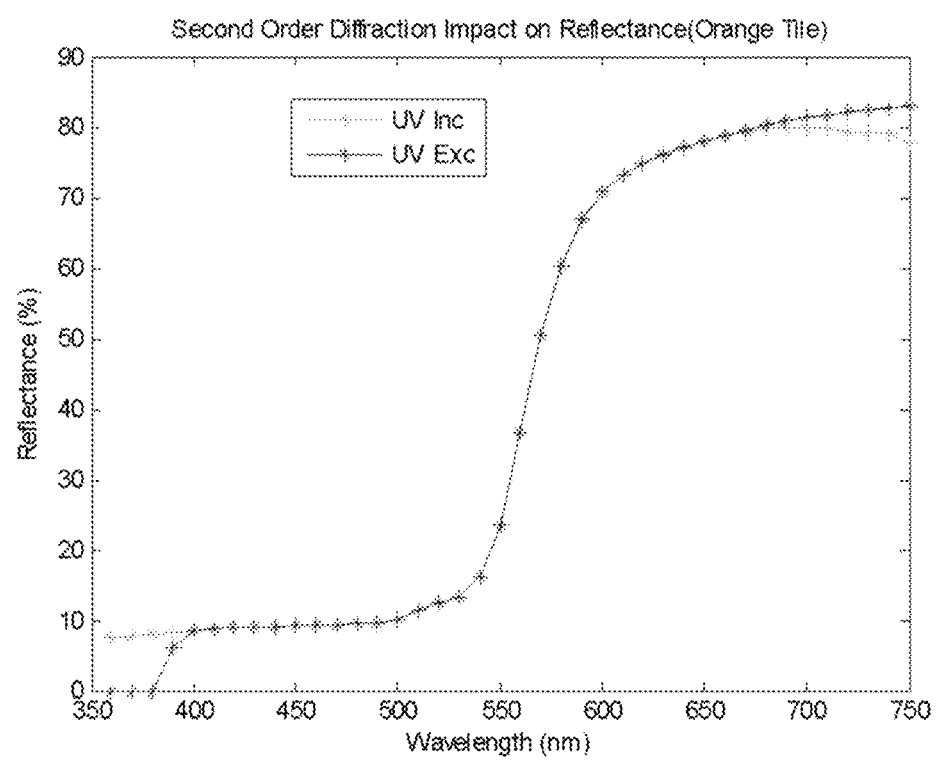
FIG. 2 is a plot showing the impact of second order diffraction on reflectance values.

In order to determine the corrected reflectance values for measurements made at the longer wavelengths, a weighting factor w(1:n) must be determined by measuring a UV-included tile calibration target at both the long and short wavelengths of a UV-included calibration target. However, as shown in FIG. 2, when the spectrometer 108 of the present invention is calibrated to include UV light and obtains measurements of a UV-included (e.g., a white) tile in order to produce rNWL, a significant portion of the signal will include ultraviolet light. To compensate for this fact, the system described is further calibrated to a UV-excluded configuration in order to adjust the w(1:n) factor.

A second set of measurements is conducted using the spectrometer calibrated with the UV-included configuration. In this particular arrangement, the reflectance percentages of a non-UV reflecting target, such as an orange tile, is measured.

The processor 110 of the system is configured by a short wavelength orange module 435, which can comprise code executing in the processor 110, to receive from the spectrometer 108, reflectance data measured at each wavelength for the n data points, as in step 335. In the recited step, an orange tile is reinserted into the spectrometer 108 and values corresponding to the wavelengths found in the n data set are measured and assigned a collective variable rNSO(1:n). The data corresponding to the n data points are stored in a memory or storage device 112 and store those data points in a memory 112.

As an example, and in no way limiting the scope of the features of the system described, in a scenario wherein n=8, the same measurement interval values and calculations as described in step 325 are replicated for the orange tile measurements.

The system is also configured to obtain measurements from longer wavelengths that are incident on the sensor elements 114 using a long wavelength orange module 440, which can comprise code executing in the processor 110, to receive from the spectrometer 108, the data relating to the wavelengths of light measured at twice the wavelength, and twice the measurement interval as each of the originally measured n data points as in step 340. These data points are assigned the variable prefix rNLO(1:n) and are stored in a memory or storage device 112. As used with the example provided for the short orange calibration measurement, the long wavelength calibration module 340 is configured to measure the reflectance percentage measured at wavelengths between 680~750 nm (i.e., twice the original n values and twice the n value measurement interval).

As noted previously, since the spectrometer used in the above configuration is calibrated a UV included configuration as a white tile calibration target, there is a significant amount of UV light included in the measured reflectance percentages. Returning to FIG. 3, when measuring low UV reflective samples, such as the orange tile, the measured reflectance values across the spectrum begin to taper off at the longer wavelengths.

The system described herein compensates for this taper by recalibrating the spectrometer 108 to exclude measurement of UV wavelengths with a UV excluded step 345. In one embodiment, a UV excluded calibration module 445 is used to configure the processor 110 to obtain a measurement of the white tile and calibrate the spectrometer for a UV excluded measurement configuration. In a particular configuration, the recalibration module includes sub-modules for obtaining stored calibration settings from a memory or remote database. Additionally, the UV excluded module 445 records the reflectance values at twice the wavelength values specified in the n data set and assigns them the variable prefix rXLW(1:n). It should be noted that, in at least some configurations of the system described, the rXLW values and the rNLW values are identical.

Once the system is calibrated in a UV excluded configuration, a measurement of orange tile is taken accordingly, as in step 350. In one configuration, a UV orange excluded measurement module 450 configures the processor 110 to obtain from the spectrometer 108 reflectance percentage values at twice the wavelength values specified in the n data set and assigns them the variable prefix rXLO(1:n) For instance, the second measurement module 450 configures the processor 110 to obtain the reflectance values from the wavelengths at the longer end of the range that would be affected by second order diffraction effect coming from the shorter wavelengths. These values are classified as rXLO(n:1) and stored in the memory 112.

Once all the measurements have been obtained from steps 320-350, a weight coefficient is calculated according to step 355. In one embodiment, a weight coefficient generation module 455 configures the processor 110 to calculate the value for a weight coefficient to correct the low UV measurements taken according to the following equation:

$$w(1:n)=(rXLO(1:n)*rNLW(1:n)-rXLW(1:n)*rNLO(1:n))/(rXLO(1:n)*rNSW(1:n)-rXLW(1:n)*rNSO(1:n)) \quad (8)$$

In a particular configuration, the w(1:n) values are stored in a memory 112 for future use or used in a real-time measurement compensation.

An additional correction coefficient is used to generate an accurate correction of the second order effects. A corrected coefficient value is generated according to step 360. In a particular embodiment, a corrected coefficient generation module 460 configures the processor to calculate a value for a coefficient to correct the UV-included measurements taken according to the following equation:

$$c(1:n)=rNLW(1:n)/((rNLW(1:n)-rNSW(1:n)*w(1:n))) \quad (9)$$

Using the values derived for c(1:n) and w(1:n), the processor of the system is configured to compensate for second order diffraction effects for any sample that is measured.

In one configuration, a sample measurement module 470 can further comprise code that configures the processor 110 to implement a sample measurement step 370 that, e.g., obtains the reflectance percentages values measured from the light reflected off of a sample under analysis. The sample measurement module 470 further configures the processor 110 to obtain the measurements of the sample according to a UV included configuration. The measurement values are stored as, rNLA(1:n), representing (un-corrected) reflectance values of the sample at longer wavelength range and rNSA(1:n) are measured reflectance values of the sample at the shorter wavelength range.

In a further implementation, the measurement values obtained from the sample are stored as a dataset for that particular sample in the memory 112 or transmitted to a remote storage device for later retrieval.

As shown in FIG. 4, all of the measurement steps provided, including obtaining the rNSW, rNLW, rXLO, rNSO and rNSL measurements are completed within a single measurement session. Alternatively, as shown in FIG. 6, the measurements are obtained separately. In this configuration, all of the calibration tile measurements are obtained at different times or locations from the sample measurement and stored in a locally or remotely accessible database or memory. In one arrangement, an access module 475 further configures the processor 110 to access, according to step 375, all the data obtained from steps 310 to 365 from the memory 112. In the alternative, the access module 475 is configured to obtain just the c(1:n) and w(1:n) values for calculation of the corrected reflectance values. Furthermore, previously obtained values such as rXLO are obtained from digital storage file. In this configuration, the measurements stored in the digital storage file were made with the same or a similar make and model spectrometer used to obtain measurements of the sample under analysis.

In order to obtain an accurate measurement of the second order diffraction effect on the spectrometer measurements and thereby remove them from the results, the corrected and weighted coefficient values are used in a second order compensation module 480, which configures the processor to calculate the true value of the reflectance values of the data points in the longer end of the wavelength range according to correction step 380.

In one configuration, a second order compensation module 480 configures the processor 110 to determine, using the measured reflectance values obtained directly or from storage 112, the corrected reflectance values occurring at different wavelengths according to the following:

$$rNLAc(1:n)=(rNLA(1:n)-rNSA(1:n)*w(1:n))*c(1:n) \quad (10)$$

where rNLAc(1:n) is the corrected reflectance values for a given sample measured at step 370, at the longer wavelength range.

Once the measurement of the corrected reflectance values obtained at the longer end of the wavelength range, the rNSA and rNLAc values are provided as the complete measurement of the spectrometer as in step 385. An output module 485 configures the processor to update a display with the corrected rNLAc and rNSA values, as well as providing the other non-corrected values.

Figure 7:
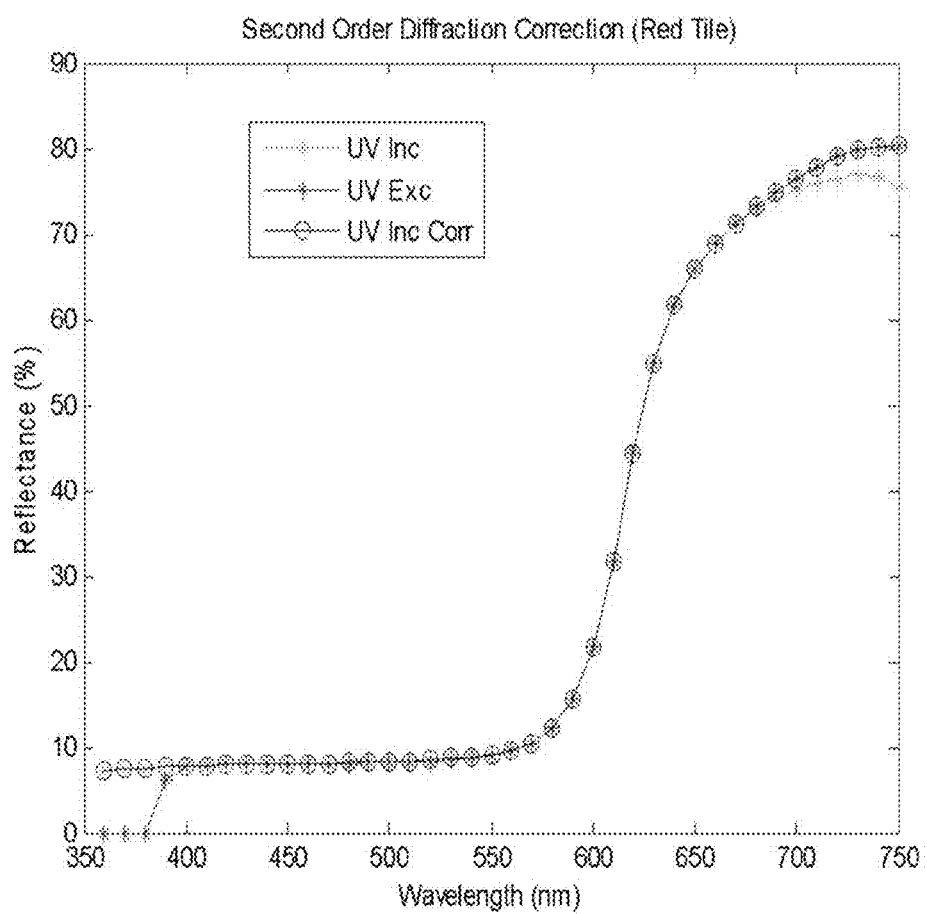
FIG. 7 is an example of an output plot according to the operation of the output module showing the corrected compensated and un-compensated measurement values according to an embodiment of the present invention.
Figure 8:
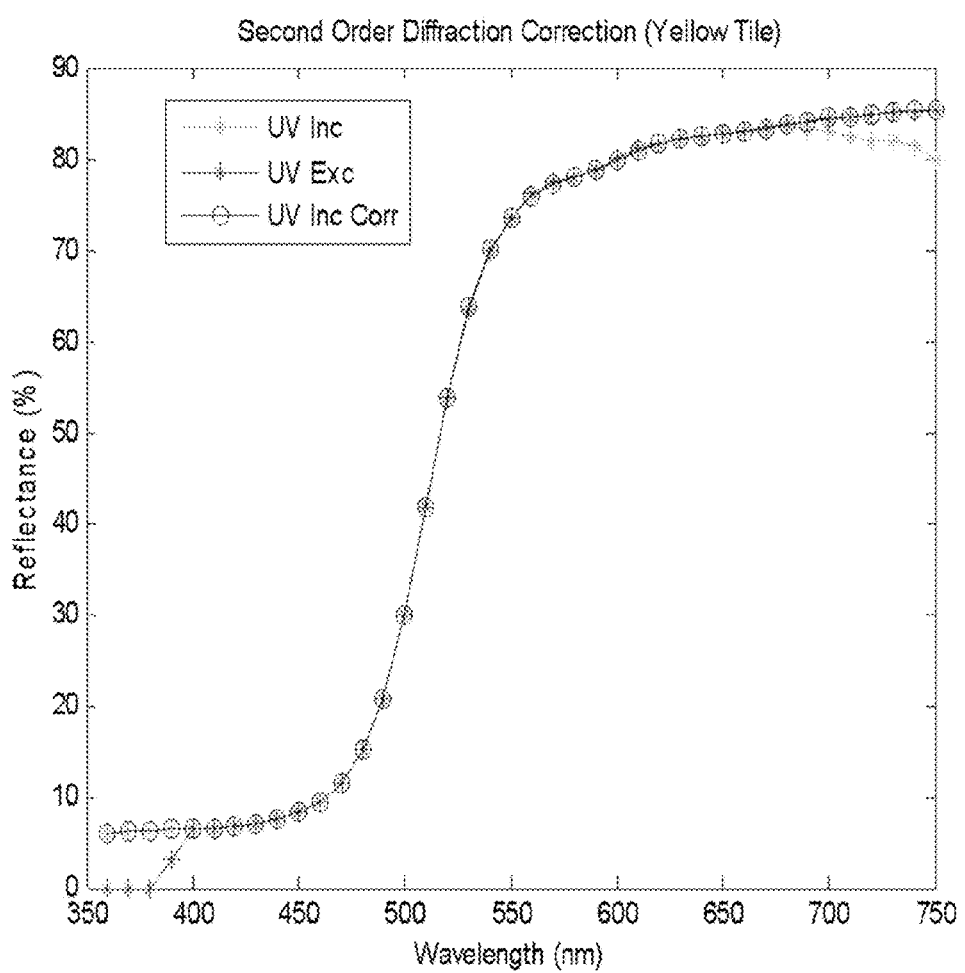
FIG. 8 is an alternative example of an output plot according to the operation of the output module showing the corrected compensated and un-compensated measurement values according to an embodiment of the present invention.

In an alternative configuration, the output module 485 configures the processor to generate a plot showing the uncorrected values against the corrected values. As illustrated in FIGS. 7 and 8, the output plot show the correction of second order diffraction effects for different sample colors.

In a further arrangement, the output module 485 configures the processor to output the corrected values, as well as the calculated coefficient values, to a database for retrieval.

The above processing functions can operate as a series of programmed steps performed by a properly configured computer system using one or more modules of computer-executable code. For instance, a set of software modules can be configured to cooperate with one another to provide prediction information regarding new chemical entities to a display device as described herein. In this regard, there can be a database access modules, search modules, filtering modules, extraction modules, conversion modules, plotting modules, prediction modules, and visualization modules.

Each of these modules can comprise hardware, code executing in a computer, or both, that configure a machine such as the computing system 100 to implement the functionality described herein. The functionality of these modules can be combined or further separated, as understood by persons of ordinary skill in the art, in analogous embodiments of embodiments of the invention.

The processor 102 of the described invention is configurable for connection to remote storage devices and computing devices. For example the processor of the described computer system may, in one embodiment, be configured for communication with a mobile computing device, or connecting via the internet to a remote server.

Figure 9:
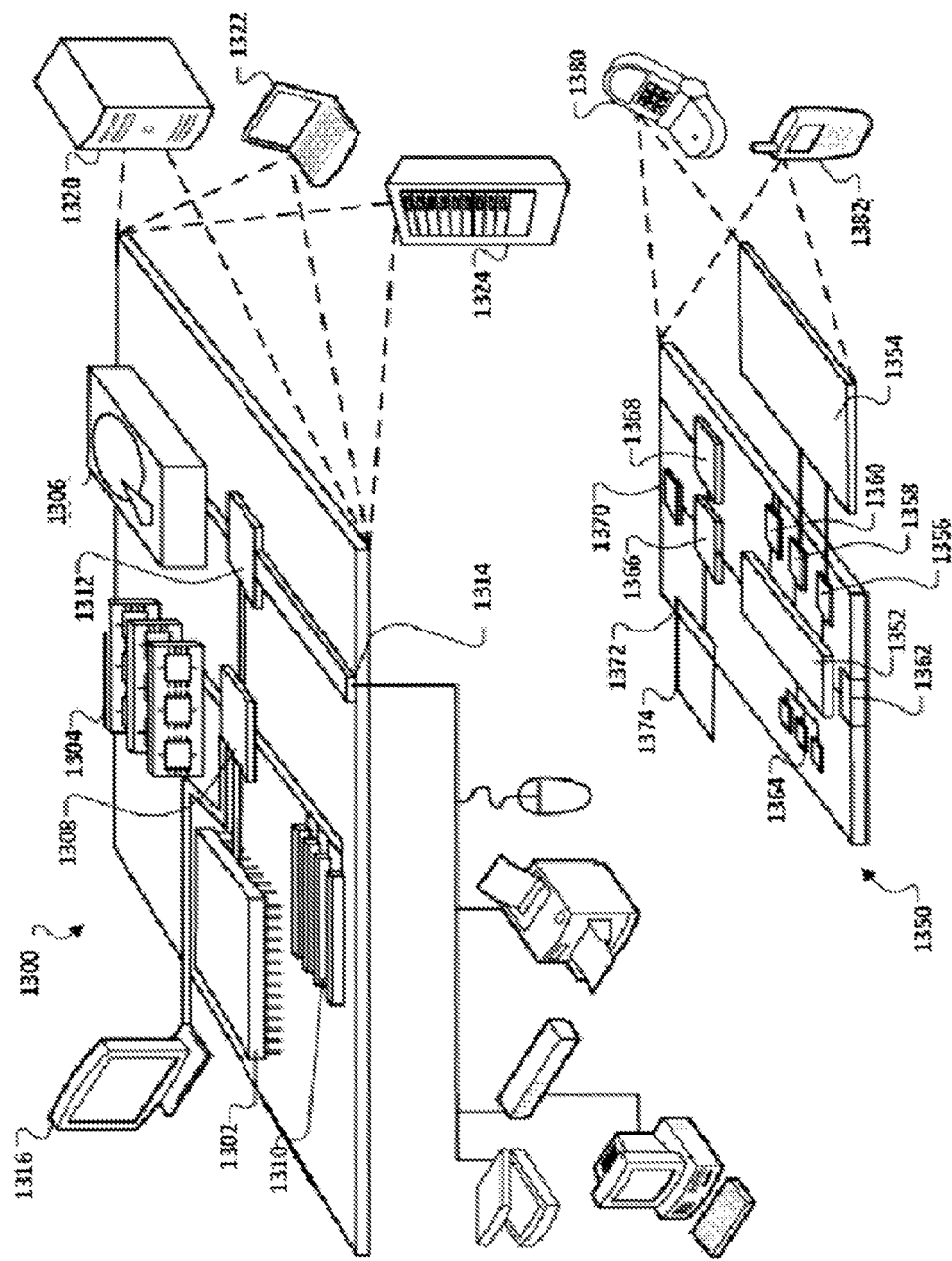
FIG. 9 is an illustrated diagram of the elements of the system of an embodiment of the present invention

As illustrated in FIG. 9, the computing system 1300 and includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various buses, and can be mounted on a common motherboard as shown in FIG. 8, or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other embodiments, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

A mobile computing device 1350 may include a processor 102, a memory 1364, and an input/output device such as a display 1354, a communication interface 1366, and a transceiver 1368, among other components. The mobile computing device 1350 can also be provided with a storage device, such as a micro-drive or other device, to provide additional storage. Each of the processor 1352, the memory 1364, the display 1354, the communication interface 1366, and the transceiver 1368, are interconnected using various buses, and several of the components can be mounted on a common motherboard or in other manners as appropriate.

The processor 1352 can communicate with a user through a control interface 1358 and a display interface 1356 coupled to the display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can provide communication with the processor 1352, so as to enable near area communication of the mobile computing device 1350 with other devices. The external interface 1362 can provide, for example, for wired communication in some embodiments, or for wireless communication in other embodiments, and multiple interfaces can also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 can also be provided and connected to the mobile computing device 1350 through an expansion interface 1372, which can include, for example, a SIMM (Single In Line Memory Module) card interface. The expansion memory 1374 can provide extra storage space for the mobile computing device 1350, or can also store applications or other information for the mobile computing device 1350. Specifically, the expansion memory 1374 can include instructions to carry out or supplement the processes described above, and can include secure information also. Thus, for example, the expansion memory 1374 can be provided as a security module for the mobile computing device 1350, and can be programmed with instructions that permit secure use of the mobile computing device 1350. In addition, secure applications can be provided via the SIMM cards, along with additional information, such as placing identifying information on the SIMM card in a non-hackable manner.

It should be understood that various combinations, alternatives and modifications of the present invention could be devised by those skilled in the art in view of this disclosure. The present invention is intended to embrace all such alternatives, modifications and variances that fall within the scope of the appended claims. While the invention has been particularly shown and described with reference to a preferred embodiment thereof, it will be understood by those skilled in the art that various changes in form and details may be made therein without departing from the spirit and scope of the invention The mobile computing device 1350 can communicate wirelessly through the communication interface 1366, which can include digital signal processing circuitry where necessary. The communication interface 1366 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1370 can provide additional navigation- and location-related wireless data to the mobile computing device 1350, which can be used as appropriate by applications running on the mobile computing device 1350.

The mobile computing device 1350 can also communicate audibly using an audio codec 1360, which can receive spoken information from a user and convert it to usable digital information. The audio codec 1360 can likewise generate audible sound for a user, such as through a speaker, e.g., in a handset of the mobile computing device 1350. Such sound can include sound from voice telephone calls, recorded sound (e.g., voice messages, music files, etc.) and sound generated by applications operating on the mobile computing device 1350.

The mobile computing device 1350 can be implemented in a number of different forms, as shown in FIG. 9. For example, it can be implemented as a cellular telephone 1380. It can also be implemented as part of a smart-phone 1382, personal digital assistant, or other similar mobile device.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include embodiment in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any non-transitory computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A non-transitory machine-readable storage medium does not include a transitory machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server 1324), or that includes a middleware component (e.g., an application server 1320), or that includes a front end component (e.g., a client computer 1322 having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the spectrometer systems and methods is not intended to be exhaustive or to limit the systems and methods described to the precise form disclosed. While specific embodiments of, and examples for, the reflectance systems and methods are described herein for illustrative purposes, various equivalent modifications are possible within the scope of other spectrometer systems and methods, as those skilled in the relevant art will recognize. The teachings of the spectrometer systems and methods provided herein can be applied to other processing and measurement systems and methods, not only for the systems and methods described above.

The elements and acts of the various embodiments described above can be combined to provide further embodiments. These and other changes can be made to the spectrometer systems and methods in light of the above detailed description.

In general, in the following claims, the terms used should not be construed to limit the spectrometer systems and methods to the specific embodiments disclosed in the specification and the claims, but should be construed to include all systems and methods that operate under the claims. Accordingly, the spectrometer systems and methods are not limited by the disclosure, but instead the scope of the spectrometer systems and methods is to be determined entirely by the claims.

While certain aspects of the spectrometer systems and methods are presented below in certain claim forms, the inventors contemplate the various aspects of the spectrometer systems and methods in any number of claim forms. Accordingly, the inventors reserve the right to add additional claims after filing the application to pursue such additional claim forms for other aspects of the spectrometer systems and methods a spectrometer; and an illumination source coupled to the spectrometer, wherein a relationship is determined between first-order-diffracted light output and second-order-diffracted light output of the spectrometer, wherein the relationship is a function of wavelength and first-order light output of the spectrometer, wherein an estimated contribution of the second-order-diffracted light output of the spectrometer is determined with the relationship, wherein spectrometer errors introduced by the second-order-diffracted light output are corrected by adjusting the spectrometer output according to the estimated contribution.

What is claimed:

1. A computer implemented method for correcting light reflectance measurements made by a spectrometer of a sample by determining the portion of the light reflectance measurement values due to second-order-diffracted light, the method comprising:
    performing obtaining, with a spectrophotometer at plurality of wavelengths in a wavelength range, a first plurality of measurements values of light reflected off of a first calibration tile, wherein the wavelength range includes wavelengths of light that, when passed through a diffraction grating, produce second-order diffracted light at another wavelength within the wavelength range and storing the first plurality of measurements in a first memory location accessible by a processor;
    performing, with the spectrophotometer at the plurality of wavelengths in the wavelength range, a second plurality of measurements values of light reflected off of a second reflection calibration tile, where the second reflection calibration tile is configured to reflect fewer wavelengths of light than the first calibration tile and storing the second plurality of measurements in a second memory location accessible by a processor;
    determining, with a processor, for a portion of the wavelength range subject to second-order-diffracted light, the relationship between the obtained first reflection measurement values within the wavelength range and the second reflection measurement values;
    generating, with a processor, using the determined relationship, at least one compensation value used to correct the first reflection measurement values to eliminate the effects of second-order-diffracted light in the first reflection measurement values;
    performing with the spectrometer a plurality of sample measurements for a sample at different wavelengths in the wavelength range;
    correcting with a processor, the sample measurements using the compensation values for each of the plurality of sample measurements to obtain corrected light reflectance measurement values that only include first-order-diffracted light; and
    transmitting, with a processor, to a user an updated record of the corrected sample measurements for the sample.

2. The method of claim 1 further comprising:
    configuring the spectrometer to receive (UV)-included light before obtaining the first and second plurality of measurement values and wherein the first calibration tile is a white calibration tile and the second calibration tile is a low UV reflection and high visible-light reflection calibration tile;
    configuring the spectrophotometer to receive UV-excluded light, and obtaining a third plurality of measurements for light reflectance values from a third reflection calibration tile, wherein the third reflection calibration tile is a low UV reflection and high visible-light reflection calibration tile;
    generating first and second compensation values based on the obtained measurements from the white and low UV reflection and high visible-light reflection calibration tiles under the UV-included and UV-excluded configurations;
    obtaining a plurality of spectrometer measurements for a sample across the measurement range;
    correcting the measured spectrometer measurement values for measurement values distorted by second-order diffracted light using the first and second calibration values; and
    transmitting to a user an updated record of the obtained measurement values for the sample.

3. The method of claim 2, wherein the second calibration value is derived using values obtained from the first calibration value.

4. The method of claim 2 wherein the low UV reflection and high visible-light reflection calibration tile is an orange calibration tile.

5. The method of calibrating the measurements made by the spectrometer of claim 1, further including the steps of:
    calibrating the spectrometer for measurement of the reflectance values across a range of wavelengths wherein the wavelengths range includes ultra-violet wavelengths;
    performing with a spectrometer, a first plurality of n reflectance measurements (rNSW(1:n)) taken at a plurality of wavelengths within wavelength range R, the measurements and taken at interval z storing the first plurality of n reflectance measurements in the first memory location accessible by the processor;
    performing with a spectrometer, a second plurality n of reflectance measurements (rNLW(1:n)) taken at a plurality of wavelengths within wavelength range R*2 and at a given interval of z*2 and the spectrometer configured to receive UV-included light incident off of a white calibration tile storing the second plurality of n reflectance measurements in the second memory location accessible by the processor;
    performing, with a spectrometer, a third plurality of n reflectance measurements (rNSO(1:n)) from the spectrometer taken at a plurality of wavelengths within wavelength range R and in given intervals z from the spectrometer configured to receive UV-included light incident off of a calibration tile with low UV reflection and high visible-light reflection storing the third plurality of measurements in a third memory location accessible by the processor;
    performing, with a spectrometer, a fourth plurality of n reflectance measurements (rNLO(1:n)) taken at a plurality of wavelengths within wavelength range R and at a given interval of z*2 from the spectrometer configured to receive UV-included light incident off the same calibration tile with low UV reflection and high visible-light reflection; storing the fourth plurality of measurements in a fourth memory location accessible by the processor
    calibrating the spectrometer for measurement of the reflected wavelengths wherein the reflected wavelengths exclude UV wavelengths;
    performing, with a spectrometer, a fifth plurality of n reflectance measurements (rXLO((1:n)); Generating a first compensation coefficient (w), and a second compensation coefficient (c) from the first, second, third, fourth and fifth plurality of measurement values and storing the fifth plurality of n measurements in a fifth memory location accessible by the processor;
    performing, with a spectrometer, a sample set of n reflectance measurements for a given sample taken at a plurality of wavelengths within wavelength range R in given intervals z (rNSA(1:n)), and taken at a plurality of wavelengths within wavelength range R*2 in given intervals z*2 (rNLA(1:n)) using a spectrometer calibrated to include UV light and storing the sample plurality of measurements in a sixth memory location accessible by the processor;

calculating, with a processor, the corrected reflectance values rNLAc(1:n) by compensating for errors due to second order diffracted light present in the measurement values of (rNLA(1:n)) according to rNLAc(1:n)=(rNLA(1:n)−rNSA(1:n)*w(1:n))*c(1:n).

6. The method of claim 5 where rNLWc(1:n)=rXLW(1:n).

7. The method of claim 5 wherein the range R is from 340 nm to 375 nm, n=8 and the interval z=5 nm.

8. The method of claim 5 wherein the measurement values for rXLO(1:n) for wavelengths R*2, are accessed by the processor from a digital file made during a previous measurement by the same instrument or by an instrument of the same make and model.

9. The method of claim 5 wherein the measurement values for rXLO(1:n) are obtained by measuring, with a spectrometer, UV-excluded light incident off of a low UV reflection and high visible-light reflection calibration tile across a plurality of wavelengths within wavelength range R*2 and at a given interval of z*2.

10. The method of claim 5 wherein the calculating corrected reflectance values step includes calculating the w(1:n) according to:

$$w(1:n)=(rXLO(1:n)*rNLW(1:n)-rXLW(1:n)*rNLO(1:n))/(rXLO(1:n)*rNSW(1:n)-rXLW(1:n)*rNSO(1:n)); \text{ and}$$

calculating c(1:n) according to:

$$c(1:n)=rNL\ W(1:n)/((rNL\ W(1:n)-rNSW(1:n)*w(1:n))).$$

11. A system for correcting the measured light reflectance values output by a spectrometer in order to correct for distortions in the light reflectance values due to second-order diffracted light, the system comprising:

A spectrometer configured to output a signal corresponding to the measured reflectance values at a plurality of discrete wavelengths across a wavelength range;

A sample under analysis;

A processor configured by code executing therein to utilize specific connections with the spectrometer and a storage device in order to effectuate a series of steps in order to obtain corrected reflectance values from the spectrometer of a sample under analysis by;

performing, with a spectrophotometer at plurality of wavelengths in a wavelength range, a first plurality of measurements values of light reflected off of a first calibration tile, wherein the wavelength range includes wavelengths of light that, when passed through a diffraction grating, produce second-order diffracted light at another wavelength within the wavelength range and storing the first plurality of measurements in a first memory location accessible by a processor;

performing, with the spectrophotometer at the plurality of wavelengths in the wavelength range, a second plurality of measurements values of light reflected off of a second reflection calibration tile, where the second reflection calibration tile is configured to reflect fewer wavelengths of light than the first calibration tile and storing the second plurality of measurements in a second memory location accessible by a processor;

determining, with a processor, for a portion of the wavelength range subject to second-order-diffracted light, the relationship between the obtained first reflection measurement values within the wavelength range and the second reflection measurement values;

generating, with a processor, using the determined relationship, at least one compensation value used to correct the first reflection measurement values to eliminate the effects of second-order-diffracted light in the first reflection measurement values;

performing with the spectrometer a plurality of sample measurements for a sample at different wavelengths in the wavelength range;

correcting with a processor, the sample measurements using the compensation values for each of the plurality of sample measurements to obtain corrected light reflectance measurement values that only include first-order-diffracted light; and transmitting, with a processor, to a user an updated record of the corrected sample measurements for the sample.

12. The system of claim 11, wherein the spectrometer is configured with a plurality of sensor sets, wherein each sensor set is configured to emit a signal when light is incident upon the sensor set.

13. The system of claim 12, further including a light source.

14. The system of claim 11, wherein each discrete wavelength within the wavelength range corresponds to a set of pixels of a detector of the spectrometer.

15. The system of claim 11, wherein the processor is configured to access from the storage device each measurement obtained at a wavelength where second order diffracted light is present and transform the measurement value such that the corrected measurement value for a sample is the light reflectance values measured at a second-order diffraction effected wavelength minus the product of:
 (a) the compensation value,
 (b) the weighting value, and
 (c) the reflectance value measured at half the wavelength of the measured second-order diffraction effected wavelength for that sample.

16. A non-transitory computer storage medium encoded with a computer program, the program comprising instructions that when executed by one or more data processing apparatus cause the one or more data processing apparatus to preform operations for obtaining from a spectrometer reflectance measurement values for white and low UV reflection and high visible-light reflection calibration tiles and generating calibrated reflectance measurements values across a wavelength range for a measured sample that does not include the effects of second order diffracted light, the operations comprising:

performing, with a spectrophotometer at plurality of wavelengths in a wavelength range, a first plurality of measurements values of light reflected off of a first calibration tile, wherein the wavelength range includes wavelengths of light that, when passed through a diffraction grating, produce second-order diffracted light at another wavelength within the wavelength range and storing the first plurality of measurements in a first memory location accessible by a processor;

performing, with the spectrophotometer at the plurality of wavelengths in the wavelength range, a second plurality of measurements values of light reflected off of a second reflection calibration tile, where the second reflection calibration tile is configured to reflect fewer wavelengths of light than the first calibration tile and storing the second plurality of measurements in a second memory location accessible by a processor;

determining, with a processor, for a portion of the wavelength range subject to second-order-diffracted light, the relationship between the obtained first reflection measurement values within the wavelength range and the second reflection measurement values;

generating, with a processor, using the determined relationship, at least one compensation value used to correct the first reflection measurement values to eliminate the effects of second-order-diffracted light in the first reflection measurement values;

performing with the spectrometer a plurality of sample measurements for a sample at different wavelengths in the wavelength range;

correcting with a processor, the sample measurements using the compensation values for each of the plurality of sample measurements to obtain corrected light reflectance measurement values that only include first-order-diffracted light; and transmitting, with a processor, to a user an updated record of the corrected sample measurements for the sample.

17. The stored computer program of claim 16, further comprising the operations of:

performing a first plurality of reflectance measurements (rNSW(1:n)) taken at a plurality of wavelengths within wavelength range R, each of the plurality of measurements taken at interval z, the measurements taken with a spectrometer configured to receive light, including UV wavelengths, reflected off of a white calibration tile using a rNSW generating module which comprises code executing in the processor;

performing a second plurality of reflectance measurements (rNLW(1:n)) taken at a plurality of wavelengths within wavelength range R*2 at a given interval of z*2, the second plurality of measurements taken with a spectrometer configured to receive light, including UV wavelengths, reflected off of a white calibration tile using a rNLW generating module which comprises code executing in the processor;

performing a third plurality of reflectance measurements (rNSO(1:n)) taken at a plurality of wavelengths within wavelength range R at a given in given intervals (z) the third plurality of measurements taken with a spectrometer configured to receive light, including UV wavelengths, reflected off of a low UV reflection and high visible-light reflection calibration tile using a rNSO generating module which comprises code executing in the processor;

performing a fourth plurality of reflectance measurements (rNLO(1:n)) taken at a plurality of wavelengths within wavelength range R*2 at a given interval of z*2, the fourth plurality of measurements taken with a spectrometer configured to receive light, including UV wavelengths, reflected off of a low UV reflection and high visible-light reflection calibration tile using a rNLO generating module which comprises code executing in the processor;

performing a fifth plurality of reflectance measurements (rXLO(1:n)) taken at a plurality of wavelengths within wavelength range R*2 at a given interval of z*2, the fifth plurality of measurements taken with a spectrometer configured to receive light, excluding UV wavelengths, reflected off of a low UV reflection and high visible-light reflection calibration tile using a rXLO generating module which comprises code executing in the processor;

measuring, with a spectrometer the reflectance values of a sample at a plurality of wavelengths within wavelength range of R (rNSA(1:n)), and at a plurality of wavelengths within range R*2 (rNLA(1:n)) using a spectrometer calibrated to include UV light using a sample measurement module which comprises code executing in the processor;

generating a corrected measurement value for (rNLA(1:n)) according to:

$$rNLAc(1{:}n)=(rNLA(1{:}n)-rNSA(1{:}n)*w(1{:}n))*c(1{:}n)$$

where rNLAc(1:n) is the corrected value of the reflectance values of the sample measured at the longer wavelengths;

$$w(1{:}n)=(rXLO(1{:}n)*rNLW(1{:}n)-rXLW(1{:}n)*rNLO(1{:}n))/(rXLO(1{:}n)*rNSW(1{:}n)-rXLW(1{:}n)*rNSO(1{:}n));\text{ and}$$

$$c(1{:}8)=rNLW(1{:}n)/((rNLW(1{:}n)-rNSW(1{:}n)*w(1{:}n)))$$
and;

Updating a data table by replacing the values for rNLA(1:n) with rNLAc(1:n) with a data table update module comprising code executing in the processor.

18. The computer implemented method of claim 16, further comprising:

displaying the data table to a user using a display module comprising code executing in the processor.

* * * * *